United States Patent
Lin et al.

(10) Patent No.: US 8,049,845 B2
(45) Date of Patent: Nov. 1, 2011

(54) OPTICAL DIFFUSION DEVICE

(75) Inventors: Chien-Cheng Lin, Taoyuan County (TW); Jyh-Horng Wang, Taoyuan County (TW); Chao-Ying Lin, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 278 days.

(21) Appl. No.: 11/896,932

(22) Filed: Sep. 6, 2007

(65) Prior Publication Data
US 2010/0214514 A1 Aug. 26, 2010

(51) Int. Cl.
*G02F 1/1335* (2006.01)
(52) U.S. Cl. ......................................... 349/112; 349/64
(58) Field of Classification Search .................. 349/112, 349/62–65; 362/330, 339, 558, 561, 615, 362/617, 619
See application file for complete search history.

(56) References Cited

U.S. PATENT DOCUMENTS

| 6,425,673 | B1 * | 7/2002 | Suga et al. ..................... 362/613 |
| 6,606,133 | B1 * | 8/2003 | Okabe .............................. 349/65 |
| 6,727,963 | B1 * | 4/2004 | Taniguchi et al. ............... 349/65 |
| 6,844,913 | B2 * | 1/2005 | Leidig ............................... 355/2 |
| 2004/0066476 | A1 * | 4/2004 | Lee et al. ....................... 349/112 |
| 2004/0125269 | A1 * | 7/2004 | Kim et al. ........................ 349/58 |

* cited by examiner

*Primary Examiner* — David Nelms
*Assistant Examiner* — David Chung
(74) *Attorney, Agent, or Firm* — Alan Kamrath; Kamrath & Associates PA

(57) ABSTRACT

An optical diffusion device applied in a backlight module includes a plate. Multiple light sources are disposed on one side of the plate. Multiple optical microstructures provided with a longer axis and a shorter axis are disposed on the plate. The longer axis of each optical microstructure is approximately arranged in parallel with a direction extending from the light source, or, in other words, the shorter axis is arranged approximately crossing the direction extending from the light source. A diffusion effect is provided to each light source through the shorter axis of the optical microstructure to increase optical radiant energy among the light sources and to eliminate the dim and dark regions among the light sources for increasing general luminance of the backlight module.

11 Claims, 9 Drawing Sheets

Fig. 2 (B)(PRIOR ART)

OPTICAL DIFFUSION DEVICE

BACKGROUND OF THE INVENTION (a) Field of the Invention

The present invention is related to an optical diffusion device, and more particularly, to one applied in a backlight module to effectively distribute streams of light from light source for increasing luminance of the entire backlight module.

(b) Description of the Prior Art

A backlight module is generally referred to a component that provides a back light source to a product and is currently applied in various types of information, communication, and consumer products, e.g., liquid crystal displays (LCD), negative scanners, sliders, or light panels for slides. Depending on the location of the light from its source to enter, the backlight module is available in edge lighting and bottom lighting. The edge lighting backlight module is usually applied in products, e.g., portable computers that require power-saving and that are thinner and lighter in construction. To meet the requirements, a light source is usually provided on an edge of the backlight module, and a light guide plate is disposed to guide streams of light emitted from the light source to a display panel.

The bottom light backlight module is usually applied in a product that requires higher brightness, e.g. a TV set. As illustrated in FIG. 1, a bottom light backlight module 1 is comprised of a frame 11. A reflective coating is applied or a reflection film 12 is attached on an inner side of the frame 11. Multiple light sources 13 are arranged and spaced at intervals in sequence. A diffuser 14 is disposed over those light sources 13. One or a plurality of optical diffusion films 15 and one or a plurality of brightness enhancing films (BEF) 16 are disposed on the diffuser 14. Finally, a display panel 17 is placed on top of the BEF to form a TFT-LCD.

Although the purpose of the optical diffusion device including the diffuser or diffusion film is only to permit uniform diffusion of the light passing through, it improves a phenomenon of dim and dark regions found with the liquid crystal module. Therefore, an improvement attempted to narrow down the dim and dark regions by extending a gap between those light sources 13 and the diffuser 14 for admitting more streams of light emitted from those light sources 13 into the diffuser 14. However, the structural design of the improvement for providing limited effect and causing the backlight module to get thicker defies the purpose of having a compact design for the liquid crystal module.

There are two types of processes for manufacturing an optical diffusion device. One process involves formation of microstructures for diffusion on a surface of a substrate, and another process is to coat micro-particles on the surface of the substrate or mix them in the substrate. The process of coating those micro-particles usually fails to provide high uniformity and high yield. The limited number of micro-particles to be coated fails to upgrade diffusion efficiency. Also, the micro-particles could easily scratch other devices. The diffusion efficiency may be upgraded by mixing those micro-particles with the substrate, but the light permeability remains low.

The microstructure formed on the surface of the substrate indicates either an irregularly fluctuating frosted glass structure or a regular lens array. The frosted glass type of structure was earlier used in the light diffusion structure. However, its diffusion rate is low, and its diffusion direction is random, thereby failing to provide diffusion in a given direction for a device including a fluorescent tube. A cylindrical lens array effectively controls diffusion direction and is currently designed in a form of a continuous arc, a sine wave, a triangle, or a square. The lens array is applied in a bottom lighting backlight module 1 in an LCD as disclosed in US2003/0184993A1 and Japanese 2000-75102. The former applies the lens array in a bottom lighting backlight module 1 in an LCD to achieve diffusion effect, and the latter applies a sine wave lens array in a collector. The design of continuous arcs, each with greater than a semicircle, achieves the best optical diffusion. As illustrated in FIGS. 2(A) and 2(B), multiple cylindrical lenses 18, each in a sine wave form or any other form, however, fail to deliver uniform diffusion of streams of light emitted from the light source (the arrow indicates the incident beams). Therefore, those optical diffusion devices fail to solve the problem of dim and dark regions found with a backlight module of the prior art.

SUMMARY OF THE INVENTION

The primary purpose of the present invention is to provide an optical diffusion device that is applied in a backlight module to increase light among light sources, thus to upgrade the general luminance of the backlight module.

To achieve the purpose, the optical diffusion device of the present invention is essentially comprised of a plate. Multiple light sources are disposed on one side of the plate to permit streams of light emitted from those light sources to be uniformly diffused through the optical diffusion device. The plate includes multiple optical microstructures respectively of a longer axis and a shorter axis, with the direction of the longer axis of each optical microstructure being approximately in parallel with a direction extending from the light source.

Although the curvature of the shorter axis is greater than that of the longer axis, a diffusion effect in the direction of the longer axis is way below that in the direction of the shorter axis. By having the direction of the longer axis of each optical microstructure arranged approximately parallel with the direction extending from the light source or having the direction of the shorter axis of each optical microstructure arranged approximately crossing with the direction extending from the light source, a better diffusion effect is achieved for the light passing through the shorter axis of each optical microstructure, thus to increase the light among multiple light sources for eliminating the dim and dark regions among those light sources and to increase the general luminance of the backlight module.

DETAILED DESCRIPTION OF THE PREFERRED EMBODIMENTS

Figure 1:
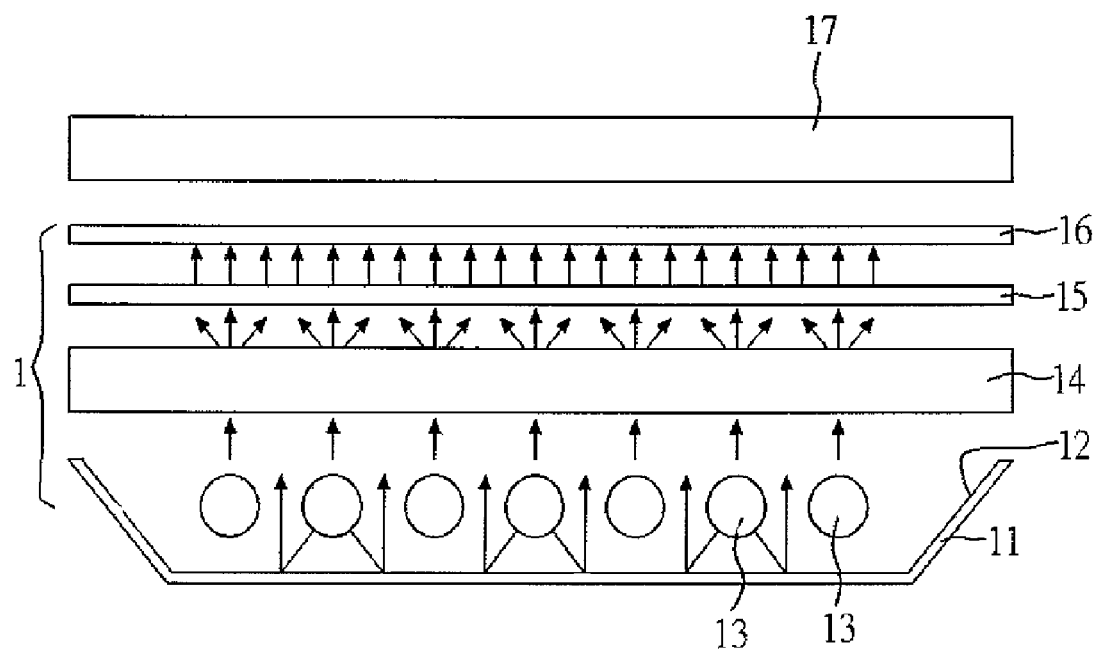
FIG. 1 is a schematic view showing a construction of a bottom lighting backlight module of the prior art.
Figure 2A:
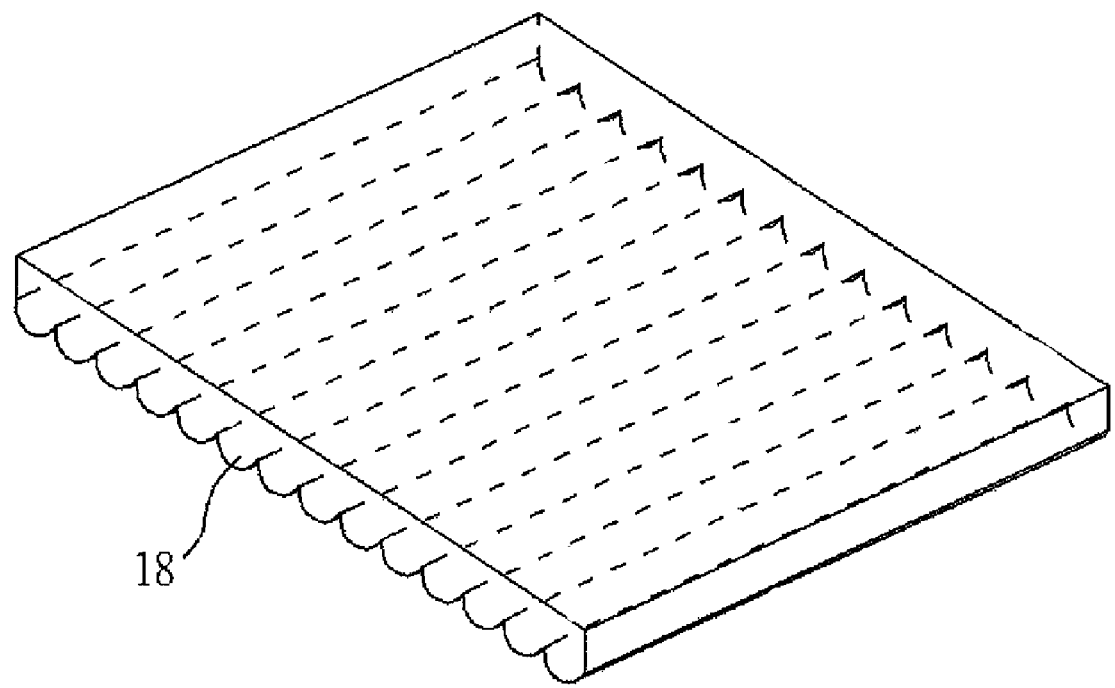
FIGS. 2 (A) and 2 (B) are schematic views showing a construction of an optical diffusion device of the prior art.
Figure 3:
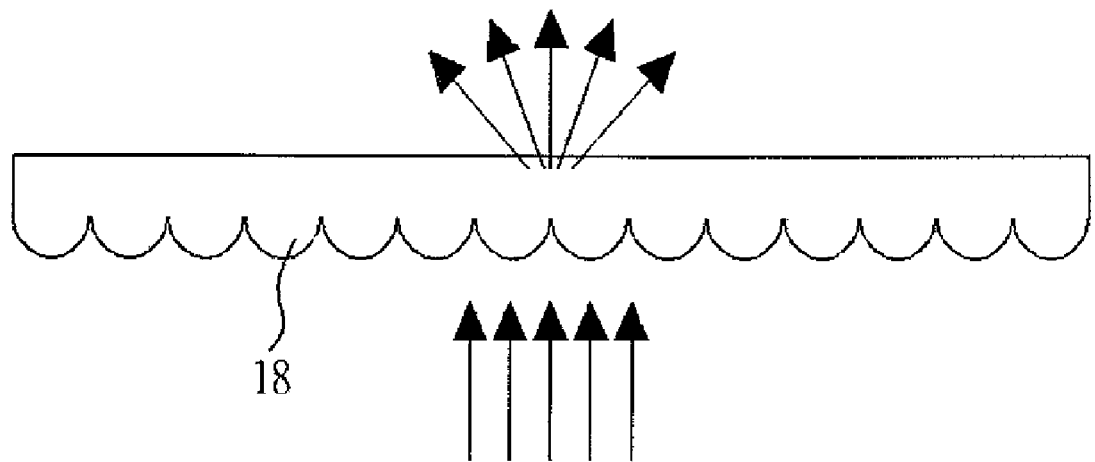
FIG. 3 is a perspective view of a construction of an optical diffusion device with light sources of the present invention.
Figure 3:
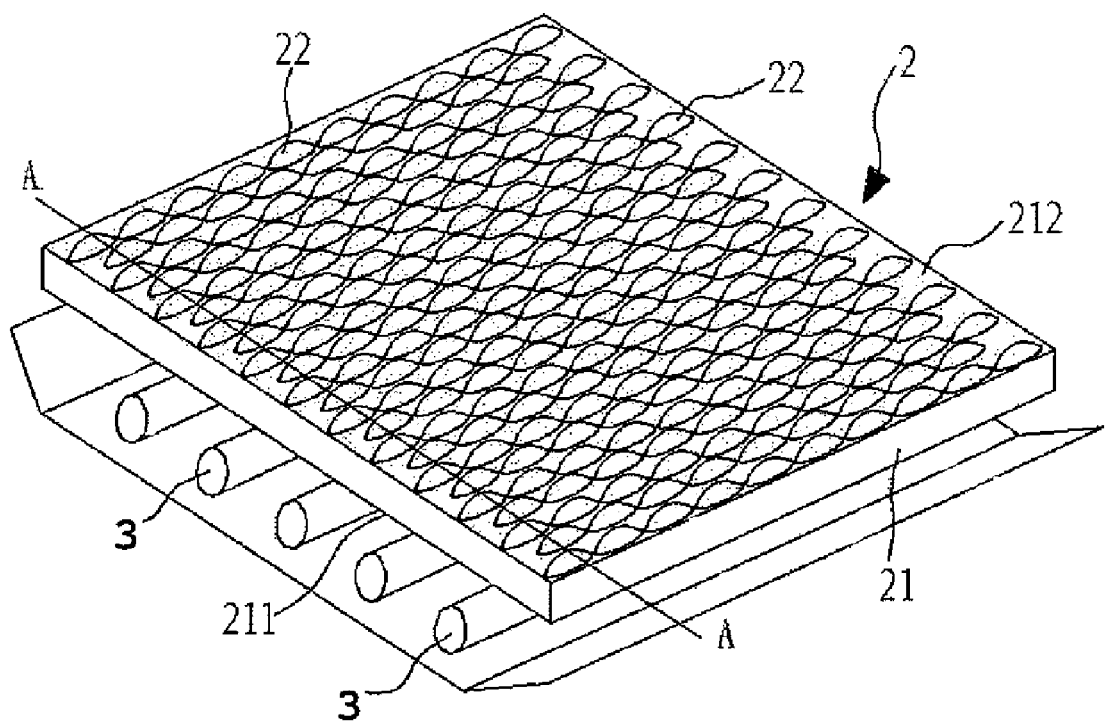

Referring to FIG. 3, an optical diffusion device 2 of the present invention is essentially comprised of a plate 21 provided with an incident plane 211 and an irradiation plane 212 opposite to the incident plane 211, Multiple light sources 3 are disposed on one side of the plate below the incident plane 211, so that light emitted from those light sources 3 are uniformly distributed through the optical diffusion device 2.

Figure 4:
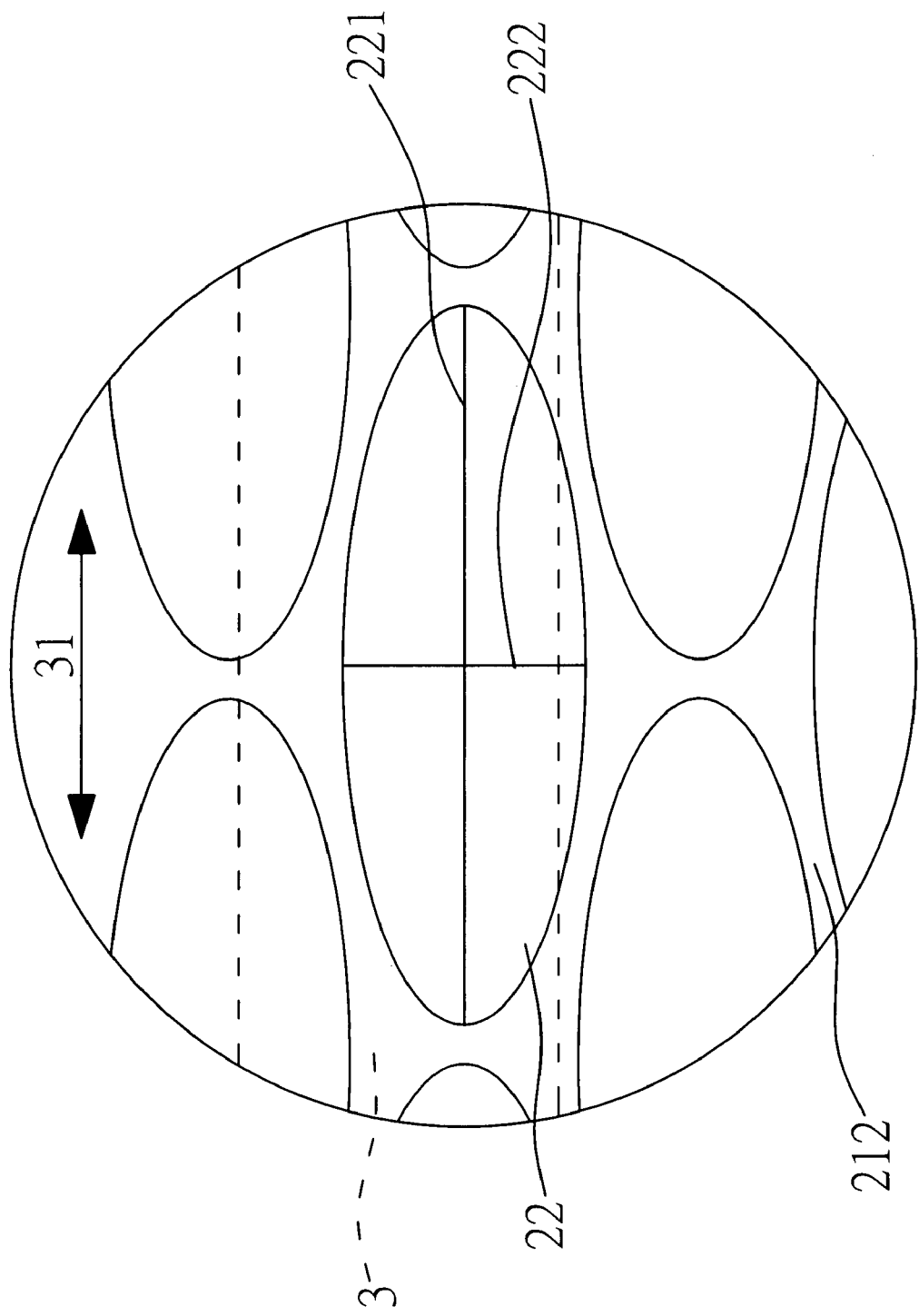
FIG. 4 is a schematic view showing a construction of a first preferred embodiment of the present invention.

The plate 21 contains multiple optical microstructures 22 each having a longer axis 221 and a shorter axis 222, with each microstructure 22 being disposed on the irradiation plane 212 in a first preferred embodiment as illustrated in FIG. 4 and a project of each optical microstructure 22 on the irradiation plane 212 can be in an oval shape. Each optical microstructure 22 as illustrated in FIG. 5 is related to an oval hemispheric structure provided with a longer axis 221 and a shorter axis 222 with the longer axis 221 provided in a direction that is approximately in parallel with a direction 31 extending from the light source 3.

Figure 5:
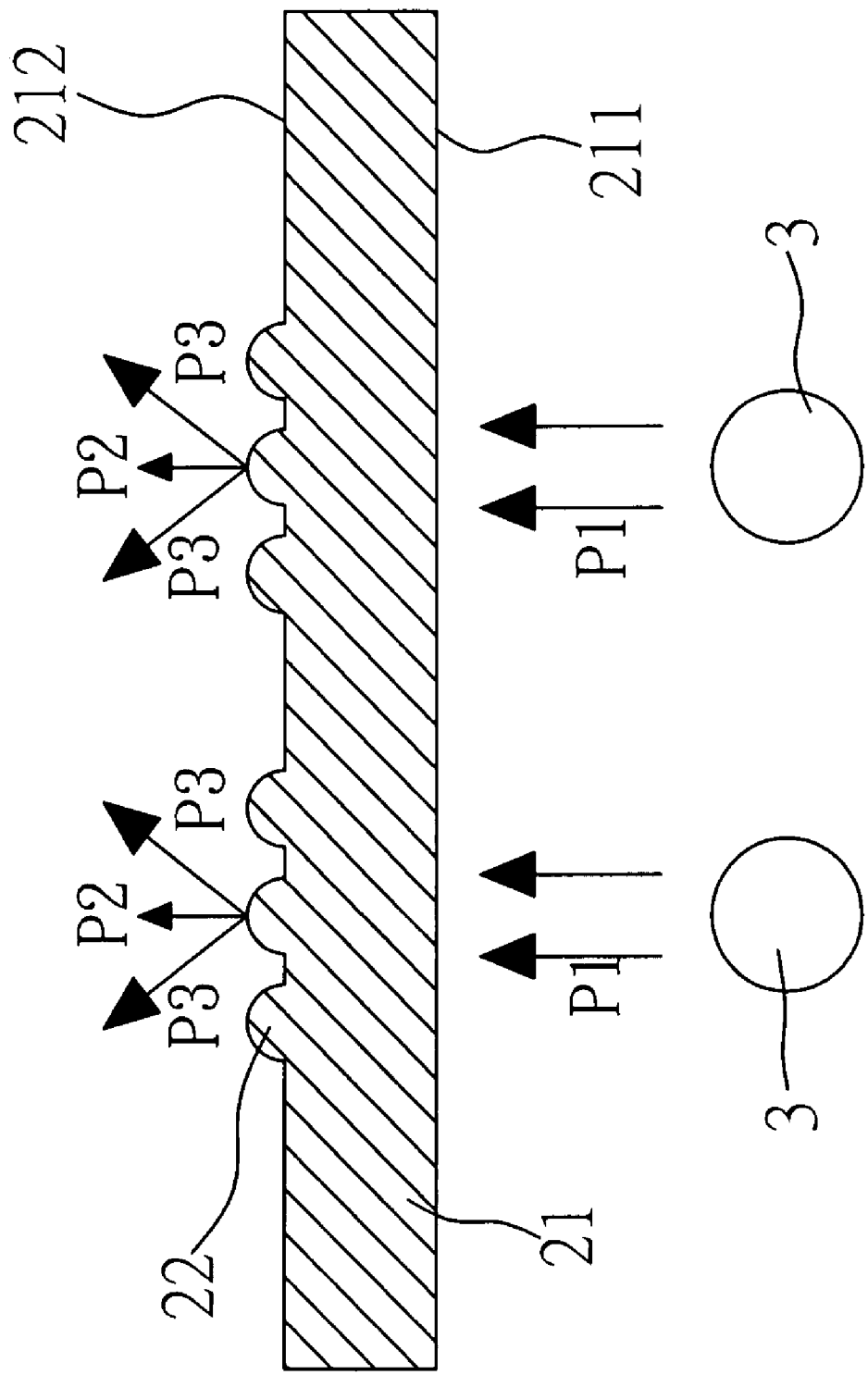
FIG. 5 is a schematic view showing a construction in A-A direction taken from FIG. 3.

When applied as illustrated in FIG. 5, the diffusion effect is less satisfactory in the direction of the longer axis 221 than that in the direction of the shorter axis 222, since a curvature of the shorter axis 222 is greater than that of the longer axis 221. By taking advantage that the direction of the longer axis 221 of each optical microstructure is approximately in parallel with the direction 31 extending from the light source 3, upon entering into those optical microstructures 22, a comparatively poor diffusion effect is achieved for streams of light P1 passing through the longer axis 221, while a better diffusion effect is achieve for those streams of light passing through the shorter axis 222. As an example, assuming that the optical radiant energy is 100% and if the optical radiant energy P2 irradiated from the longer axis 221 is 40%, the optical radiant energy P3 irradiated from the shorter axis 221 is 60%. That is, the optical radiant energy P2 irradiated from a direction extending from the light source 3 is lower and that going toward where among those light sources 3 is higher thus to increase the optical radiant energy P2 among those light sources 3 to eliminate the dim and dark regions otherwise existing among those light sources 3 for increasing a general luminance of the backlight module.

Figure 6:
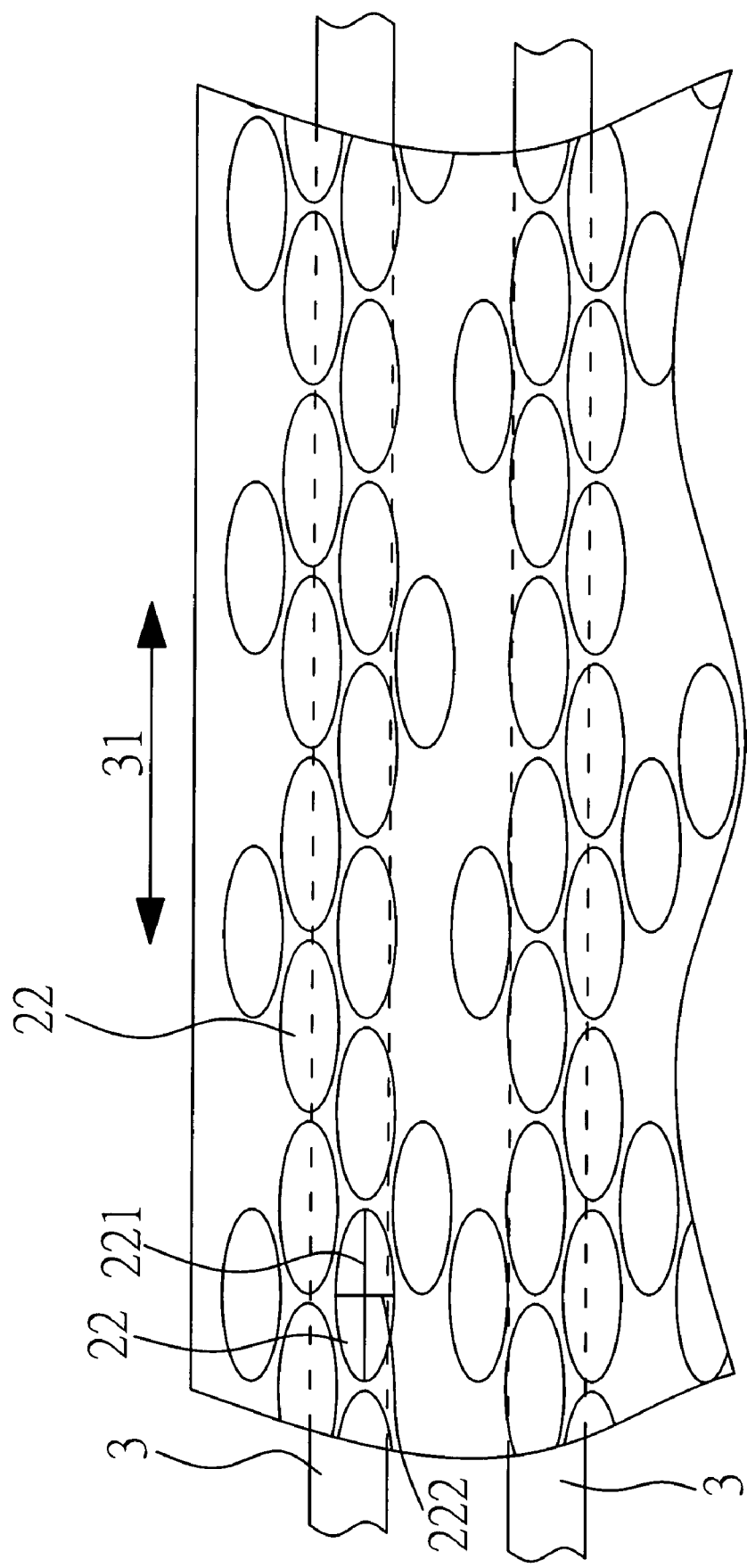
FIG. 6 is a schematic view showing a construction of a second preferred embodiment of the present invention.
Figure 7:
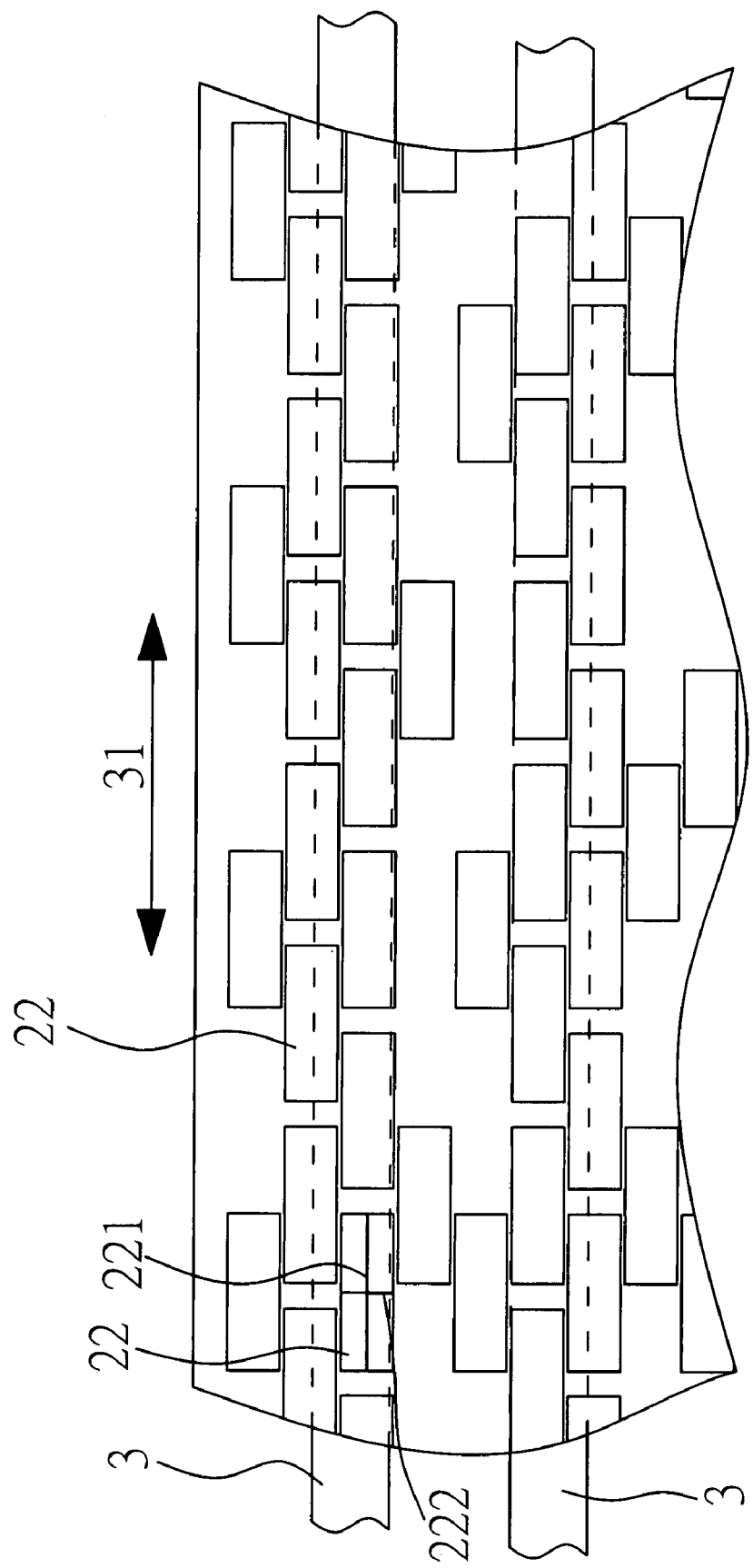
FIG. 7 is a schematic view showing a construction of a third preferred embodiment of the present invention.

In a second preferred embodiment as illustrated in FIG. 6, multiple optical microstructures 22 are arranged at random on the irradiation plane 212 of the plate 21; each optical microstructure 22 is related to a structure in an oval hemispheric shape provided with the longer axis 221 and the shorter axis 222; a direction of the longer axis 221 is approximately in parallel with a direction 31 extending from the light source 3; multiple optical microstructure 22 are more densely arranged over those light sources 3; and the optical microstructure 22 may be made in a stick shape in a third preferred embodiment as illustrated in FIG. 7.

Figure 8:
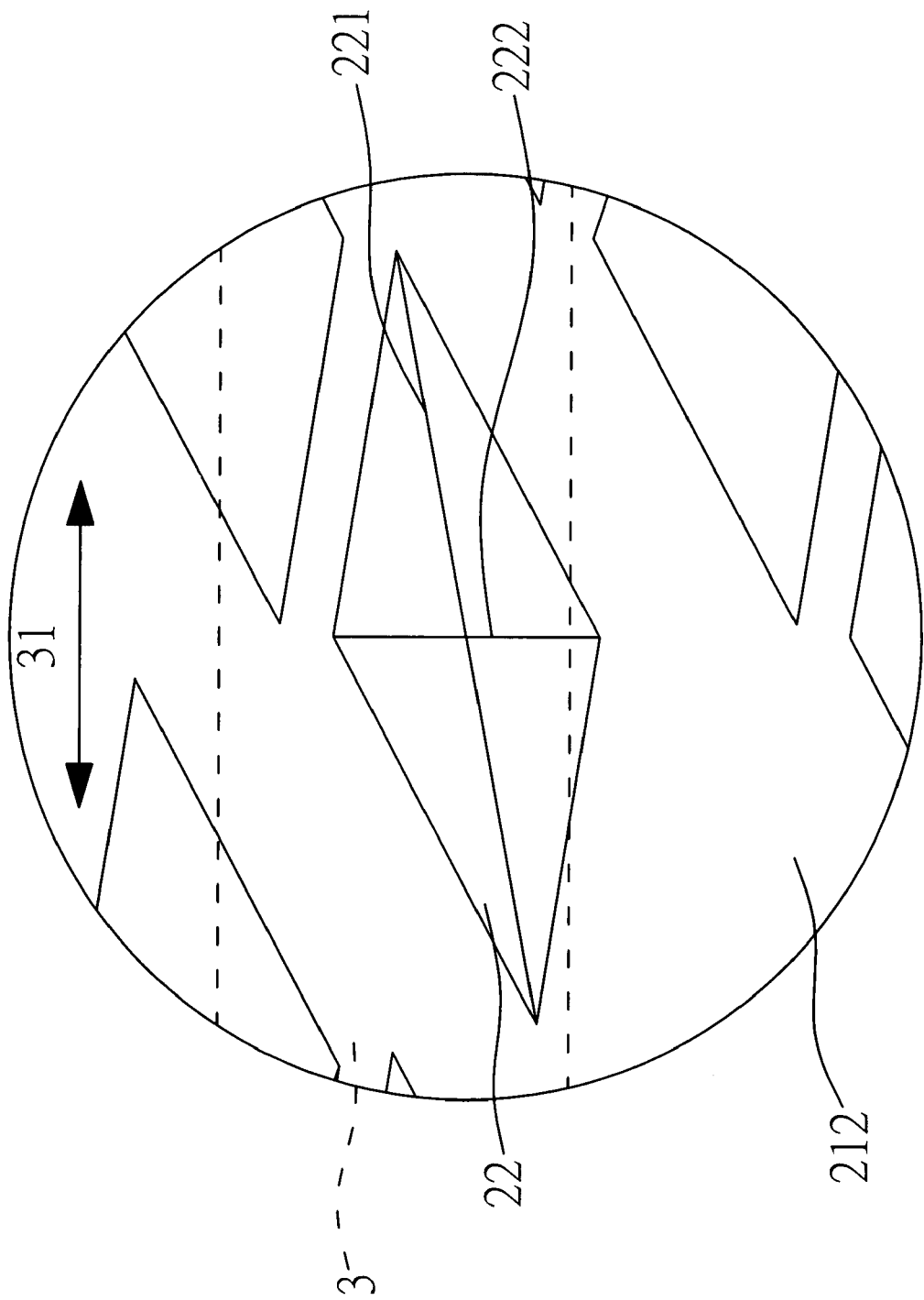
FIG. 8 is a schematic view showing a construction of a fourth preferred embodiment of the present invention.

Multiple optical microstructures 22 are arranged at random on the irradiation plane 212 of the plate 21 in a fourth preferred embodiment as illustrated in FIG. 8, wherein the optical microstructure 22 is related to a structure in a rhombus cylindrical shape provided with a long axis 221 and a shorter axis 222 and the direction of the shorter axis 222 is approximately crossing with the direction 31 extending from the light source 3.

Figure 9:
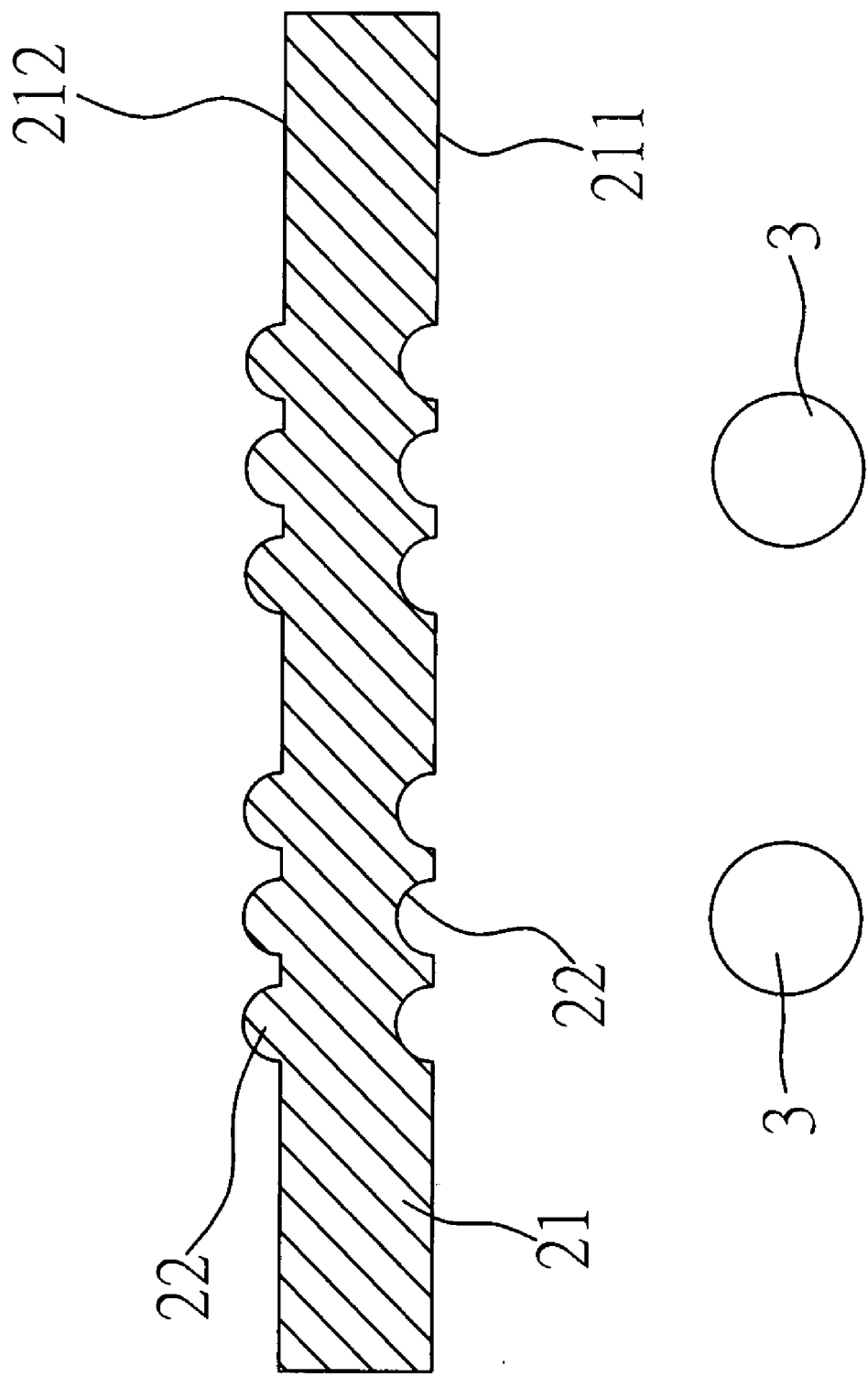
FIG. 9 is a schematic view showing a construction of a fifth preferred embodiment of the present invention.

In a fifth preferred embodiment as illustrated in FIG. 9, multiple optical microstructures 22 are disposed on the irradiation plane 212 of the plate 21 with each optical microstructure 22 protruding from a surface of the irradiation plane 212; additional multiple microstructures 22 are disposed on the incident plane 211 with each optical microstructure 22 recessed in a surface of the incident plane 211.

Figure 10:
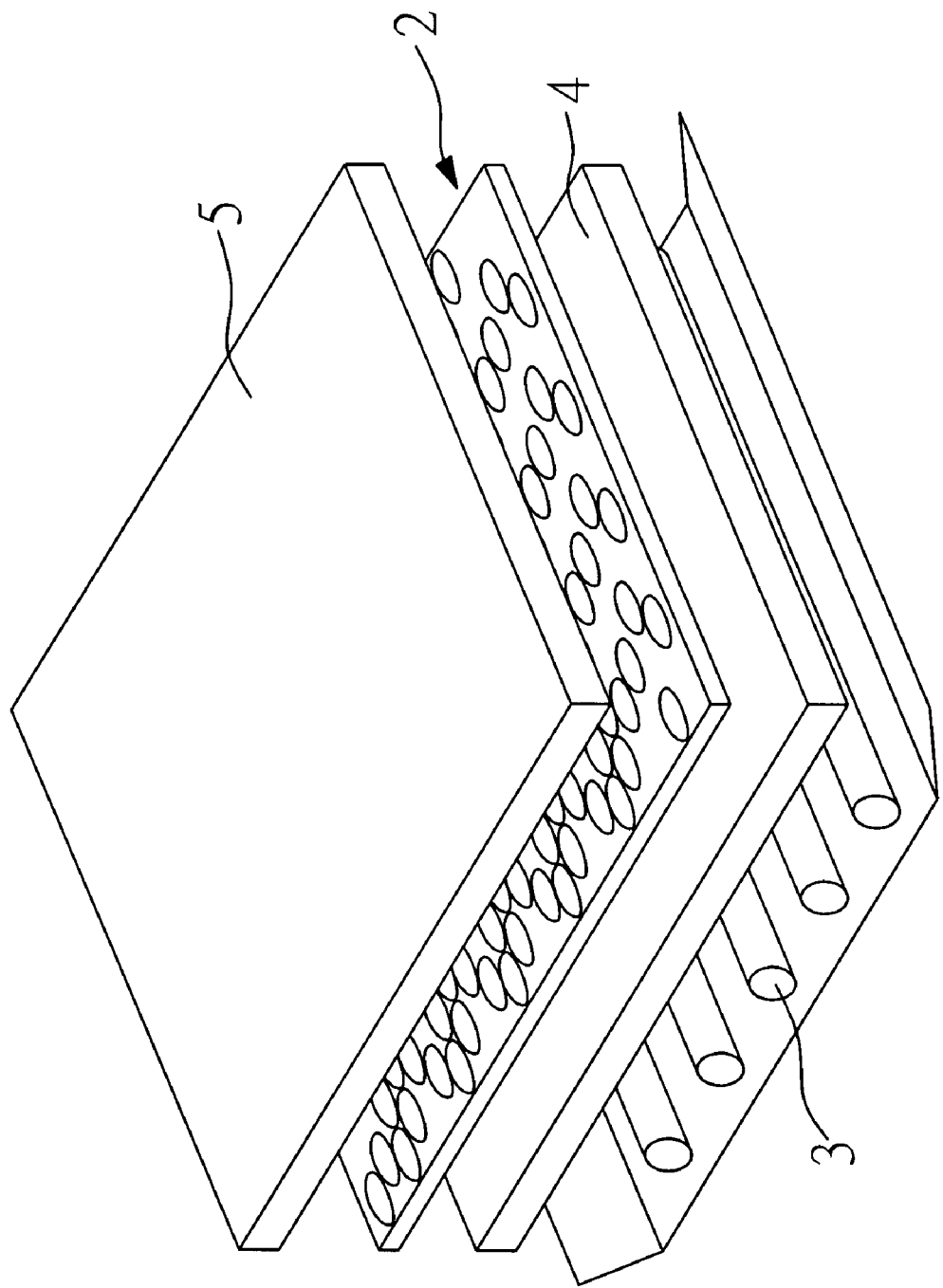
FIG. 10 is a perspective view showing a construction of the present invention applied in a backlight module.

FIG. 10 shows a perspective view of a construction of having the optical diffusion device of the present invention applied in the backlight module. A first LCD panel 4 is disposed between multiple light sources 3 and the optical diffusion device 2; a second LCD Panel 5 is disposed on the optical diffusion device 2 so to provide a 3D display; and multiple optical microstructures 22 are disposed on the irradiation plane 212 of the optical diffusion device 2 to correct a moiré effect found with the prior art that creates bright and dark ripples in vision.

When compared to the prior art, the present invention provides the following advantages:

1. The microstructure is provided with longer and shorter axes 221 and 222 to produce different diffusion effects for effectively distribution streams light emitted from light sources 3.

2. By having the direction of the longer axis 222 of those optical microstructures 22 arranged in approximately parallel with the direction 31 extending from the light source 3 or having the direction 31 of the shorter axis 221 of those optical microstructures 22 arranged approximately in crossing the direction 31 extending form the light source 3 for providing better diffusion effect to the light source 3 through the shorter axis 221 of those optical microstructures 22, the optical radiant energy P2 is increased among those light sources 3 to eliminate the dim and dark regions otherwise existing among those light sources 3 for increasing the general luminance of the backlight module.

3. With the optical diffusion device 2 of the present invention applied in a 3D display and the optical diffusion device 2 of the present invention disposed between the first and the second LCD panels 4 and 5, the moiré effect found with a 3D display of the prior art to create ripples in vision is corrected.

The prevent invention provides an improved structure of an optical diffusion device 2. However, it is to be noted that the preferred embodiments disclosed in the specification and the accompanying drawings are not limiting to the present invention; and that any construction, installation, or characteristic that is the same or similar to that of the present invention should fall within the scope of the purposes and claims of the present invention.

We claim:

1. An optical diffusion device comprising:
a plate having one side and an opposite side;
multiple optical microstructures provided on at least one of the side and the opposite side of the plate; and
multiple light sources disposed on the one side of the plate, with each light source having a long direction and a short direction, wherein each optical microstructure has a longer axis and a shorter axis; with the longer axis of each optical microstructure being approximately arranged in parallel with the long direction of the multiple light sources, with the one side of the plate being intermediate the multiple light sources and the opposite side of the plate, wherein the one side of the plate is an incident plane and the opposite side is an irradiation plane opposite to the incident plane; wherein the multiple light sources are disposed below the incident plane; wherein each optical microstructure is disposed on the irradiation plane; and wherein the multiple optical microstructures are more densely arranged over the multiple light sources.

2. The optical diffusion device as claimed in claim 1, wherein additional optical microstructures are further provided on the incident plane.

3. The optical diffusion device as claimed in claim 2, wherein a projection from each additional optical microstructure on the irradiation plane has an oval shape.

4. The optical diffusion device as claimed in claim 1, wherein each optical microstructure has a structure in an oval hemispherical, rhombus, cylindrical or stick form.

5. The optical diffusion device as claimed in claim 1, wherein a first LCD panel is disposed between the multiple light sources and the plate; and wherein a second LCD panel is disposed on the plate opposite to the multiple light sources to display a 3D image.

6. The optical diffusion device as claimed in claim 5, wherein multiple optical microstructures are further disposed on the incident plane.

7. An optical diffusion device comprising: a plate having one side and an opposite side; multiple optical microstructures provided on at least one of the side and the opposite side of the plate; and multiple light sources disposed on the one side of the plate, with each light source having a long direction and a short direction; wherein each optical microstructure has a longer axis and a shorter axis; with the shorter axis of each optical microstructure approximately crossing the long direction of the multiple light sources, with the one side of the plate being intermediate the multiple light sources and the opposite side of the plate, wherein the one side of the plate is an incident plane and the opposite side is an irradiation plane opposite to the incident plane; wherein the multiple light sources are disposed below the incident plane; wherein each optical microstructure is disposed on the irradiation plane; and wherein the multiple optical microstructures are more densely arranged over the multiple light sources.

8. The optical diffusion device as claimed in claim 7, wherein additional optical microstructures are further provided on the incident plane.

9. The optical diffusion device as claimed in claim 7, wherein each optical microstructure has a structure in an oval hemispherical, rhombus, cylindrical or stick form.

10. The optical diffusion device as claimed in claim 7, wherein a first LCD panel is disposed between the multiple light sources and the plate; and wherein a second LCD panel is disposed on the plate opposite to the multiple light sources to display a 3D image.

11. The optical diffusion device as claimed in claim 10, wherein additional optical microstructures are further provided on the incident plane.

\* \* \* \* \*